March 1, 1966 R. M. GRIGGS 3,237,327
AUTOMOBILE CERTIFICATE HOLDER
Filed Nov. 21, 1963
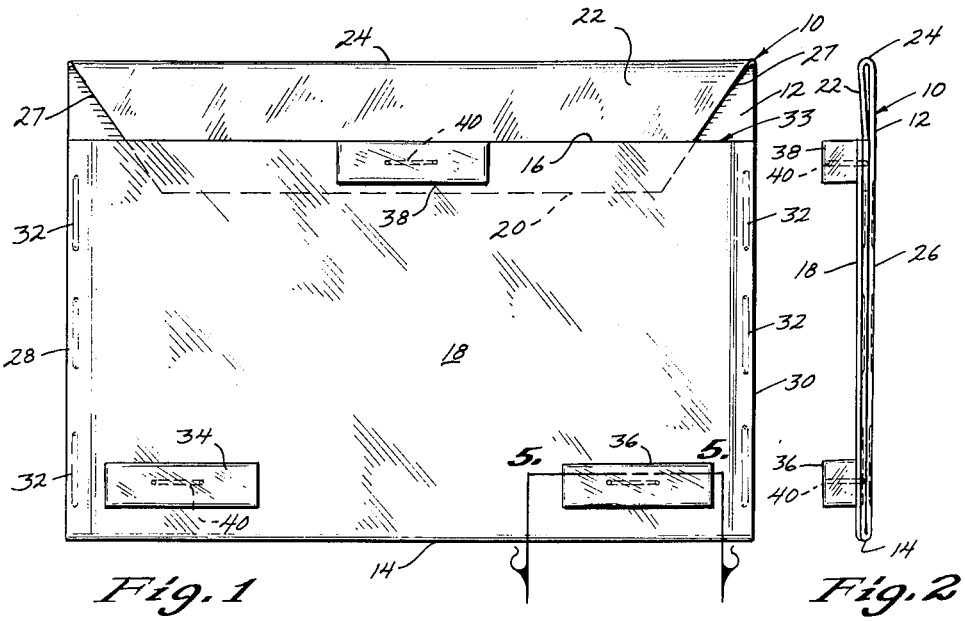
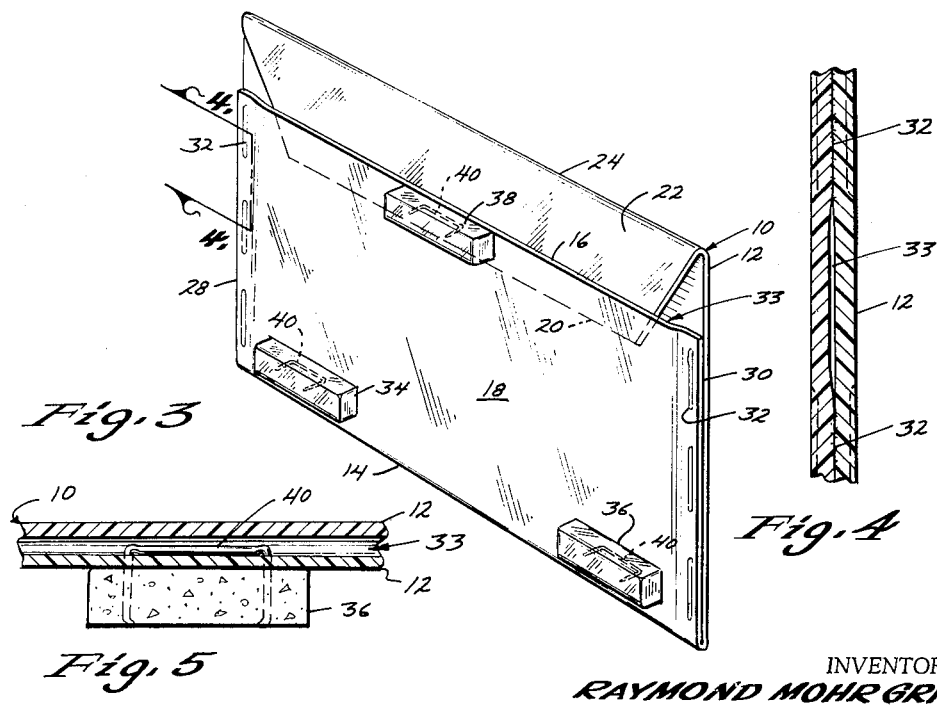
INVENTOR.
RAYMOND MOHR GRIGGS
BY
*Dick & Farley*
ATTORNEYS

United States Patent Office 3,237,327
Patented Mar. 1, 1966

3,237,327
AUTOMOBILE CERTIFICATE HOLDER
Raymond Mohr Griggs, Grimes, Iowa
Filed Nov. 21, 1963, Ser. No. 325,400
1 Claim. (Cl. 40—10)

For many years, automobile certificate holders were characteristically secured to the steering wheel apparatus of the vehicle. The size of modern steering wheel mechanisms has been increased to the point where it is now impractical to mount the certificate holder thereon. Signal light control arms have contributed to this problem.

Other certificate holders have been devised for attachment to other portions of the vehicle interior but they are sometimes difficult to secure in place and often become detached from their point of connection to the vehicle. If the means of securing these units to the vehicle is permanent, dust collects on the units and on the vehicle and a cleaning problem arises. In addition, it is sometimes difficult to make these present units conform to the countour or shape of the portion of the vehicle to which they are attached.

Therefore, a principal object of this invention is to provide an automobile certificate holder which can be easily attached to and detached from the dashboard of an automotive vehicle.

A further object of this invention is to provide an automobile certificate holder which can be easily adapted to adjust to the contours and shapes of various dashboard designs.

A still further object of this invention is to provide an automobile certificate holder which can be easily cleaned and which can be easily detached so that the dashboard to which it is secured can be cleaned.

A still further object of this invention is to provide an automobile certificate holder which does not require any reconstruction of the dashboard or vehicle to complete the attaching or detaching of the certificate holder to the vehicle.

A still further object of this invention is to provide an automobile certificate holder which will not mar or scratch the surface of the dashboard while it is being used thereon.

A still further object of this invention is to provide an automobile certificate holder which will permit a certificate contained therein to be easily visible.

A still further object of this invention is to provide an automobile certificate holder that is economical of manufacture, durable in use, and refined in appearance.

These and other objects will be apparent to those skilled in the art.

This invention consists in the construction, arrangements, and combination, of the various parts of the device, whereby the objects contemplated are attained as hereinafter more fully set forth, specifically pointed out in the claim, and illustrated in the accompanying drawing, in which:

FIGURE 1 is a rear elevational view of the automobile certificate holder herein contemplated;

FIGURE 2 is an end elevational view of the certificate holder shown in FIGURE 1 as viewed from the right-hand end of FIGURE 1;

FIGURE 3 is a rear perspective view of the certificate holder shown in FIGURE 1;

FIGURE 4 is a partial sectional view of the automobile certificate holder of this invention as viewed on line 4—4 of FIGURE 3; and FIGURE 5 is a partial sectional view of one of the magnet elements as viewed on line 5—5 of FIGURE 1.

The numeral 10 generally designates an envelope structure which is primarily comprised of a single transparent sheet 12 of unitary construction. Sheet 12 is folded transversely substantially at its center to create a bottom edge 14 and an upper rear edge 15. The rearward face 18 is substantially rectangular in shape and is defined by the bottom edge 14 and the upper rear edge 16 of sheet 12.

The upper forward edge 20 terminates in a flap element 22 which is created by the transverse fold 24. It should be noted from FIGURES 1 and 3 that the fold 24 is at a higher elevation than the upper rear edge 16. The forward face 26 of the envelope structure is defined generally by the bottom edge 14 and the fold 24. As shown in FIGURES 1 and 3, the sides of flap element 22 are mitered as indicated at 27.

The overlapping side edges 28 and 30 of sheet 12 are compressed together under heated conditions and sealed at points 32. The sealing of the edges 28 and 30 creates an inner compartment 33 within the envelope structure 10. As shown in FIGURES 1 and 3, the lower portion of the flap element 22 can be inserted into the upper portion of the compartment 33.

Prior to the time that the edges 28 and 30 are sealed in the manner described above, magnets 34, 36 and 38 are positioned in spaced apart relation on the rearward face 18 of the envelope structure 10. The magnets 34, 36 and 38 are generally rectangular in shape and are comprised of a flexible, resilient rubber-like material which has the consistency of a relatively tough rubber substance. Magnet elements 34 and 36 are positioned in alignment adjacent the lower corners of the envelope structure as shown in FIGURES 1 and 3 and magnet element 38 is positioned on the center of the upper rear edge 16 of sheet 12. Each of the magnet elements are secured to the rearward face 18 of sheet 12 by a staple 40 which is U-shaped and which penetrates the rearward face 18 of sheet 12 from the "inside" towards the "outside" of compartment 33. Again, the magnet elements are preferably secured to the sheet 12 prior to the time that the edges 28 and 30 are sealed in the manner indicated.

After the envelope structure 10 has been fabricated in the manner described above, the automobile certificate can be inserted within the compartment 33 by withdrawing the flap element 22 from the compartment, sliding the certificate downwardly into the compartment, and then the flap element 22 is preferably returned to the position indicated in FIGURE 1.

The envelope structure 10 is then placed on the normally metallic surface of a vehicle dashboard with the rearward face 18 extending downwardly so that the three magnet elements 34, 36 and 38 can directly engage the metal dashboard. If there is a variation in the contour of the dashboard, the envelope structure can be deflected so that each of the magnet elements can firmly engage the variable contour of the dashboard. The envelope structure 10 will remain in fixed contact with the dashboard until forcibly removed therefrom, and the rubber-like flexible resilient magnet elements will not harm or scratch the dashboard surface while the unit is mounted thereon. Obviously, the magnetic elements do not require any special fabrication or treatment of a dashboard surface. In addition, the envelope structure can be removed from the dashboard surface to facilitate the cleaning thereof. Since the envelope structure 10 is comprised of a single transparent sheet 12, the fabrication thereof is greatly facilitated. The heat sealing of the edges of the envelope and the use of staples to secure the magnets in place both contribute to the economy of fabrication of the unit.

From the foregoing, it is seen that the device of this invention will accomplish at least all of its stated objectives.

Some changes may be made in the construction and arrangement of my automobile certificate holder without departing from the real spirit and purpose of my invention, and it is my intention to cover by my claim, any modified forms of structure or use of mechanical equivalents which may be reasonably included within their scope.

I claim:

In a certificate holder, an envelope structure having forward and rearward outer faces, and having an inner compartment formed by said faces, a plurality of spaced apart flexible magnets comprised of magnetized rubber-like material on the outside of said rearward outer face; each of said magnets having a bottom supporting surface, U-shaped staples having a horizontal portion and leg portions at the ends of said horizontal portion, the horizontal portion of said staples being within said compartment and adjacent the inner surface of said rearward face, with the legs of each of said staples extending outwardly through said rearward face and into one of said flexible magnets, the outer ends of said leg portions extending towards but not through the supporting surface of said magnets so as to avoid the marring of any surface upon which said envelope structure is placed in supporting condition on said magnets.

References Cited by the Examiner

UNITED STATES PATENTS

| | | |
|---|---|---|
| 712,447 | 10/1902 | Wooley. |
| 1,683,645 | 9/1928 | Abbey _____ 40—16 |
| 2,725,913 | 12/1955 | Horwin _____ 40—159 |
| 2,935,936 | 5/1960 | Woodring _____ 40—142 |
| 2,959,832 | 11/1960 | Baermann _____ 40—142 |
| 3,184,807 | 5/1965 | Schornstheimer ___ 317—159 X |

FOREIGN PATENTS 400,098   10/1933   Great Britain.

EUGENE R. CAPOZIO, *Primary Examiner.*

WENCELSO J. CONTRERAS, *Assistant Examiner.*